United States Patent
Kawaguchi et al.

(10) Patent No.: US 6,751,971 B2
(45) Date of Patent: Jun. 22, 2004

(54) VARIABLE DISPLACEMENT TYPE COMPRESSOR, AIR CONDITIONER WITH THE VARIABLE DISPLACEMENT TYPE COMPRESSOR, AND METHOD FOR CONTROLLING DISPLACEMENT IN THE VARIABLE DISPLACEMENT TYPE COMPRESSOR

(75) Inventors: Masahiro Kawaguchi, Kariya (JP); Takayuki Kato, Kariya (JP); Seiji Katayama, Kariya (JP); Fuminobu Enokijima, Kariya (JP); Satoshi Umemura, Kariya (JP); Ryo Matsubara, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 10/272,119

(22) Filed: Oct. 16, 2002

(65) Prior Publication Data

US 2003/0084674 A1 May 8, 2003

(30) Foreign Application Priority Data

Oct. 22, 2001 (JP) ..................... P2001-323783

(51) Int. Cl.⁷ ............................. F25B 1/00; F25B 49/00
(52) U.S. Cl. ....................................... 62/228.5; 62/229
(58) Field of Search ................................ 62/228.5, 229; 417/222.2, 222.1, 269, 270, 213; 74/60

(56) References Cited

U.S. PATENT DOCUMENTS

| 6,056,513 | A | 5/2000 | Kawaguchi et al. |
| 6,321,545 | B1 | 11/2001 | Ota et al. |
| 6,336,335 | B2 * | 1/2002 | Ota et al. ................. 62/133 |
| 6,386,834 | B1 | 5/2002 | Kimura et al. |
| 2001/0017036 | A1 | 8/2001 | Kawaguchi et al. |
| 2003/0094008 | A1 * | 5/2003 | Yoshida et al. ........... 62/228.3 |
| 2003/0097849 | A1 * | 5/2003 | Taguchi .................... 62/133 |

FOREIGN PATENT DOCUMENTS

| JP | 05-306679 | 11/1993 |
| JP | 10-061549 | 3/1998 |
| JP | 2000-220577 | 8/2000 |
| JP | 2001-090667 | 4/2001 |

\* cited by examiner

Primary Examiner—Marc Norman
(74) Attorney, Agent, or Firm—Knoble Yoshida & Dunleavy

(57) ABSTRACT

A variable displacement type compressor circulates a refrigerant in an air conditioning circuit. The compressor has a compression mechanism and a displacement controller. The compression mechanism compresses and discharges the refrigerant. The displacement controller controls the discharge amount of the refrigerant of the compressor. The displacement controller further includes a normal control means and a protective control means. The normal control means controls the displacement based on a cooling load. The protective control means controls the displacement based on the value in connection with the rotational speed of the compressor and the actual operating information of the compressor.

18 Claims, 5 Drawing Sheets

VARIABLE DISPLACEMENT TYPE COMPRESSOR, AIR CONDITIONER WITH THE VARIABLE DISPLACEMENT TYPE COMPRESSOR, AND METHOD FOR CONTROLLING DISPLACEMENT IN THE VARIABLE DISPLACEMENT TYPE COMPRESSOR

BACKGROUND OF THE INVENTION

The present invention relates to a variable displacement type compressor. More particularly, the present invention relates to a method for controlling displacement in the variable displacement type compressor.

In a typical variable displacement type compressor that introduces and compresses a refrigerant through reciprocating movement of a piston and raises the pressure of the refrigerant to be discharged, to reduce its weight, the variable displacement type compressor includes a hollow piston. The hollow piston is generally manufactured by connecting two members. When the hollow piston is employed, even at high-speed operation of the variable displacement type compressor, inertial force generated by the movement of the piston is relatively restrained and strength of the piston is relatively ensured. Also, the hollow piston effectively prevents hunting caused by unstable piston strokes and improves displacement control even at the high-speed operation.

However, compared to a solid piston, the hollow piston is more costly to manufacture since two members are required to manufacture the hollow piston. In spite of its lower cost, if the solid piston is applied to a compressor, the weight of the piston increases and the solid piston may negatively influence the strength of the piston itself and the displacement control, especially at high-speed operation. Thus, the weight of the piston is an element that determines the inertia force caused by the movement of the piston. The hollow piston increases the reliability of the compressor itself, such as the strength of the piston itself and the displacement control, but the difficulty of lowering the manufacturing cost still remains. Whereas, the solid piston lowers the manufacturing cost, but increasing the reliability of the compressor itself remains difficult.

Japanese Unexamined Patent Publication No 2001-90667 discloses such a variable displacement type compressor that controls its displacement control valve so as to decrease the amount of discharged refrigerant as the rotational speed of a vehicle engine becomes high. The above mentioned variable displacement type compressor effectively controls the amount of discharged refrigerant based on a variation of the inertia force of the piston especially at the high-speed operation.

However, the compressor that controls amount of discharged refrigerant based on the rotational speed has the following problem. For instance, even when control of the amount of discharged refrigerant is not required in spite of the high rotational speed for the vehicle engine, the control of the amount of the discharge refrigerant is performed. Even when the compressor is relatively at a low running state, controlling the amount of discharged refrigerant is performed and thus the amount of discharged refrigerant decreases.

SUMMARY OF THE INVENTION

The present invention is directed to a variable displacement type compressor that accurately controls the displacement of discharged refrigerant by taking an operating state of the compressor into consideration.

According to the present invention, a variable displacement type compressor circulates a refrigerant in an air conditioning circuit. The compressor has a compression mechanism and a displacement controller. The compression mechanism compresses and discharges an amount of the refrigerant at a discharge pressure. The displacement controller controls the discharge amount of the refrigerant of the compressor based upon displacement. The displacement controller further includes a normal control means and a protective control means. The normal control means controls the displacement based on a cooling load. The protective control means controlling the displacement based on a value in connection with a rotational speed of the compressor and the actual operating information on the compressor which is determined by a value of an actual discharge amount and a reference value of the discharge amount.

The present invention also provides a method for controlling a displacement of a variable displacement type compressor. The method includes detecting a cooling load, controlling a discharge amount of a refrigerant based on the cooling load, detecting a value in connection with a rotational speed of the compressor, calculating the value of the actual discharge amount of the refrigerant, calculating the reference value of the discharge amount of the refrigerant, determining the actual operating information based on the value of the actual discharge amount and the reference value of the discharge amount, and further controlling the actual discharge amount based on the value in connection with the rotational speed and the actual operating information.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A variable displacement type compressor according to a first embodiment of the present invention will now be described with reference to FIGS. 1 to 5. In the present embodiment, a variable displacement swash plate type compressor, for a vehicle air conditioner, which compresses a drawn refrigerant to a predetermined pressure level and discharges the compressed refrigerant, will be employed.

Figure 1:
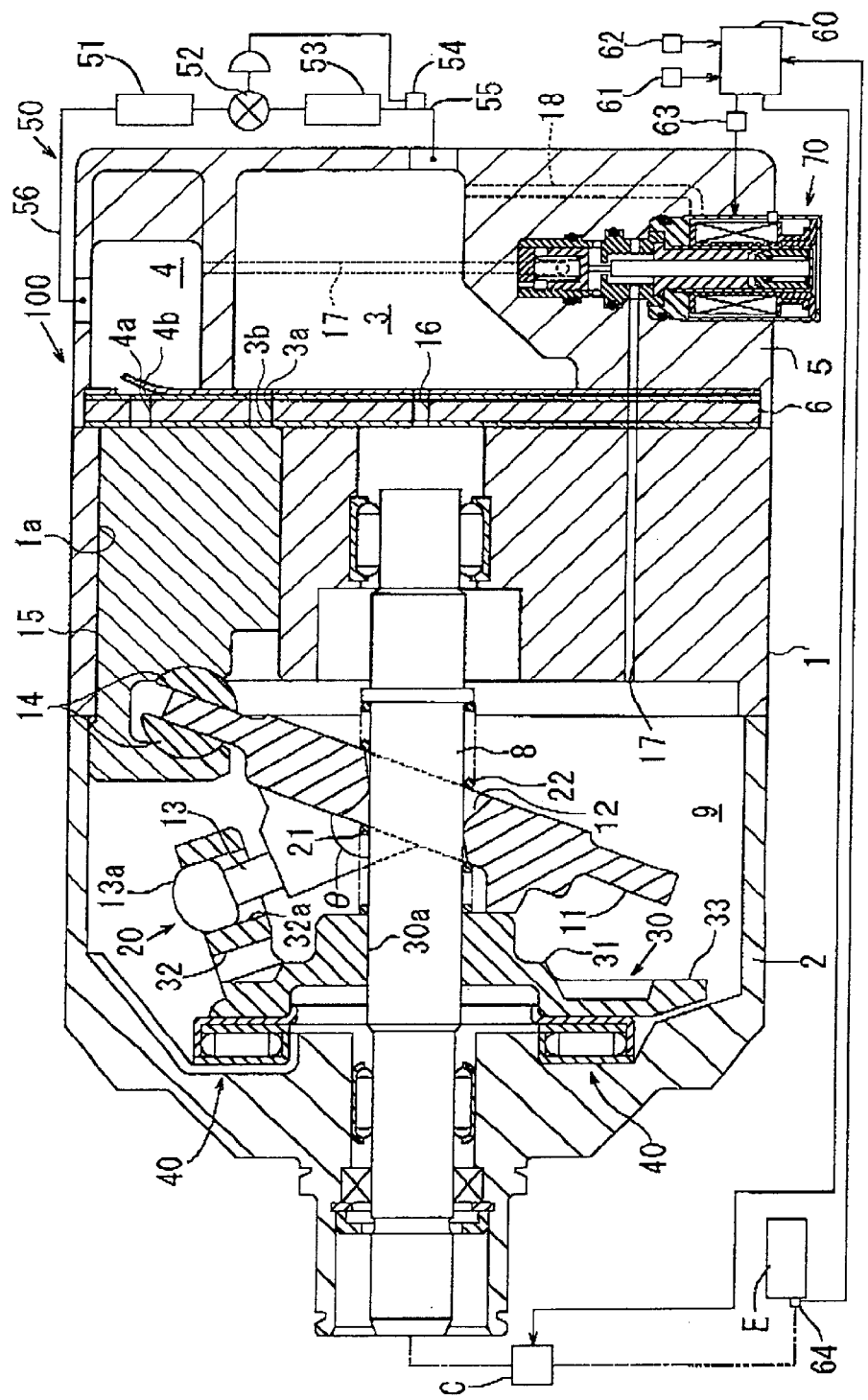
FIG. 1 is a longitudinal cross-sectional view illustrating a variable displacement type compressor 100 according to an embodiment of the present invention.

As shown in FIG. 1, a variable displacement swash plate type compressor 100 (hereafter referred to as a compressor)

includes a cylinder block 1, a front housing 2 secured to the front end of the cylinder block 1, and a rear housing 5 secured to the rear end of the cylinder block 1 through a valve plate assembly 6.

A suction chamber 3 and a discharge chamber 4 are defined between the rear housing 5 and the valve plate assembly 6. A refrigerant is drawn into the suction chamber 3, and is discharged to the discharge chamber 4. A suction port $3a$ that communicates the suction chamber 3 and a cylinder bore $1a$ via a suction valve $3b$ and a discharge port $4b$ that communicates the discharge chamber 4 and the cylinder bore $1a$ via a discharge valve $1b$ are formed in the valve plate assembly 6. A crank chamber 9 is defined between the cylinder block 1 and the front housing 2. A bleeding passage 16 that communicates the crank chamber 9 and the suction chamber 3 is also formed in the valve plate assembly 6. A passage 18 for introducing high pressure is interposed between the suction chamber 3 and a displacement control valve 70 that is explained later.

A drive shaft 8 is connected to a vehicle engine E functioning as an external drive source through a clutch mechanism C such as an electromagnetic clutch. The drive shaft 8 is inserted through the cylinder block 1 and the front housing 2. Thus, the drive shaft 8 is rotatively driven through the clutch mechanism C while the vehicle engine is running. The drive shaft 8 is also rotatably supported by bearing mechanisms that are placed respectively in the cylinder block 1 and the front housing 2. Furthermore, instead of the clutch mechanism C in the present embodiment, a clutchless mechanism that does not have a clutch mechanism but is constantly transmittable type may be used. For example, a combination of a belt and a pulley may be employed.

A swash plate 11 that is in the shape of disk is accommodated in the crank chamber 9. A through hole 12 is formed substantially at the center of the swash plate 11 and the drive shaft 8 is inserted into the through hole 12. Furthermore, a pair of guide pins 13 that each has a spherical portion $13a$ at each end is formed on the opposite side of the cylinder block 1 on the swash plate 11. A rotor 30 is fixedly mounted on the drive shaft 8 in which the rotor 30 is integrally rotated with the drive shaft 8. The rotor 30 has a circular rotary plate 31 and the circular rotary plate 31 is provided with a pair of support arms 32 and a balance weight 33. An insertion hole $30a$ in which the drive shaft 8 is inserted is formed in rotary plate 31.

The rotor 30 is connected to the swash plate 11 through a hinge mechanism 20. The hinge mechanism 20 includes the support arms 32 on the rotor 30 and the guide pins 13 on the swash plate 11 that are engaged with each other. The support arms 32 each have a guide hole $32a$ that is formed so as to correspond to the spherical portion $13a$ of the guide pin 13. As the spherical portion $13a$ of the guide pin 13 is inserted into the corresponding guide hole $32a$, the guide pin 13 is slidable relative to the guide hole $32a$ while the support arm 32 supports the guide pin 13. Therefore, as the support arm 32 and the guide pin 13 are engaged with each other, the hinge mechanism 20 enables the swash plate 11 to incline relative to the drive shaft 8 while rotating torque of the drive shaft 8 is transmitted to the swash plate 11. In other words, the swash plate 11 is slidable and inclinable with respect to the drive shaft 8.

A spring 21 for reducing an inclination angle $\theta$ of the swash plate 11 is placed around the drive shaft 8 between the rotor 30 and the swash plate 11. The spring 21 pushes the swash plate 11 in the direction which the inclination angle $\theta$ of the swash plate 11 is to be decreased. A restoring spring 22 is also placed around the drive shaft 8 in the rear (on the right side of FIG. 1) of the swash plate 11. When the swash plate 11 is placed at a maximum inclination angle, the restoring spring 17 that is wound around the drive shaft 8 does not interact with other members including the swash plate 11. However, when the swash plate 11 is placed at a minimum inclination angle, the restoring spring 22 pushes the swash plate 11 in the direction which the inclination angle $\theta$ of the swash plate 11 is to be increased.

A thrust bearing 40 that contacts the front surface of the rotary plate 31 is located between the rotor 30 and the front housing 2. A piston 15 reciprocates in the cylinder bore $1a$ through the swash plate 11. The piston 15 is solid and constituted of one piece. Thereby, the weight of the piston 15 is larger than that of a hollow piston. The compression reactive force caused by the reciprocating motion of the piston 15 is received by the front housing 2 through the piston 15, a pair of shoes 14, the swash plate 11, the hinge mechanism 20 and the thrust bearing 40.

The predetermined number of cylinder bores $1a$ that is arranged in a circumferential direction at predetermined intervals is formed in the cylinder block 1. The piston 15 is slidably accommodated in each cylinder bore $1a$. The front side of the piston 15 is connected to the swash plate 11 through the shoes 14. Therefore when the rotation of the drive shaft 8 causes the swash plate 11 to rotate, each of the pistons 15 reciprocates in the associated cylinder bore $11a$ in accordance with the rotation of the swash plate 11. Thus, the reciprocating motion of the pistons 15 initiates the suction of refrigerant gas into the cylinder bore $1a$ in a suction process and the discharge of the highly pressurized and compressed refrigerant gas from the cylinder bore in a discharge process.

The amount of discharged refrigerant from the compressor 100 or the displacement of the compressor 100 is defined by the stroke distance of the piston 15 (or the distance between the top dead center and the bottom dead center of the piston) and the stroke distance of the piston 15 is defined by the inclination angle $\theta$ of the swash plate 11. In other words, as the inclination angle $\theta$ of the swash plate 11 with respect to an axis L of the drive shaft 8 becomes large, the stroke distance of the piston 15 and the displacement of the compressor 100 increase, in contrast, as the inclination angle $\theta$ of the swash plate 11 with respect to the axis L of the drive shaft 8 becomes small, the stroke distance of the piston 15 and the displacement of the compressor 100 decrease. While the compressor 100 runs, the inclination angle $\theta$ of the swash plate 11 is defined by the pressure differential (or pressure differential in flow rate) between the inside of the cylinder bore $1a$ and the inside of the crank chamber 9 and the pressure differential is adjusted by the displacement control valve 70. FIG. 1 shows such a state that the inclination angle $\theta$ of the swash plate 11 is relatively large, in other words, the amount of discharged refrigerant is relatively large and the load acting on the compressor 100 is also relatively large.

The inclination angle $\theta$ of the swash plate 11 is defined by the interaction among the various moments such as the moment of the rotary motion caused due to the centrifugal force of the swash plate 11 during the rotation, the moment of the spring tension caused due to the urging force of the spring 21 and the restoring spring 22, the moment of the reciprocating inertia force of the piston 15, and the moment of the refrigerant pressure. The moment of the refrigerant pressure is the moment caused due to the interaction between the internal pressure of the cylinder bore $1a$ and the internal pressure of the crank chamber 9 (or crank pressure Pc). Furthermore, the moment of the refrigerant pressure is applied so as to decrease and increase the inclination angle of the swash plate 11 in accordance with the crank pressure Pc. In the compressor 100, the moment of the refrigerant pressure is properly varied by adjusting the crank pressure Pc with the displacement control valve 70 described hereafter. Thereby, the compressor 100 enables the inclination angle θ of the swash plate 11 to be the predetermined angle that is between the minimum inclination angle θmin and the maximum inclination angle θmax. Furthermore, the maximum inclination angle θmax is regulated by the contact between the swash plate 11 and the rotor 30. On the other hand, the minimum inclination angle θmin is determined considering the balance in urging force between the spring 21 and the restoring spring 22 as the governing factor under the circumstances that the moment of the refrigerant pressure is substantially farthest applied in the direction that the inclination angle of the swash plate 11 decreases.

The displacement control valve 70 is placed in supply passages 17a and 17b that communicate the discharge chamber 4 and the crank chamber 9 within the range of the cylinder block 1 and the rear housing 5. The displacement control valve 70 is an electromagnetic valve and adjusts the opening degree of the supply passages 17a and 17b. By adjusting the opening degree of the supply passages 17a and 17b, the crank pressure Pc varies and the pressure differential between the pressure in the cylinder bore 1a and the crank pressure Pc is varied. Consequently, the inclination angle θ of the swash plate 11 with respect to the drive shaft 8 is varied. The stroke distance of the piston 15 is adjusted, in other words, the amount of discharged refrigerant is adjusted.

Figure 2:
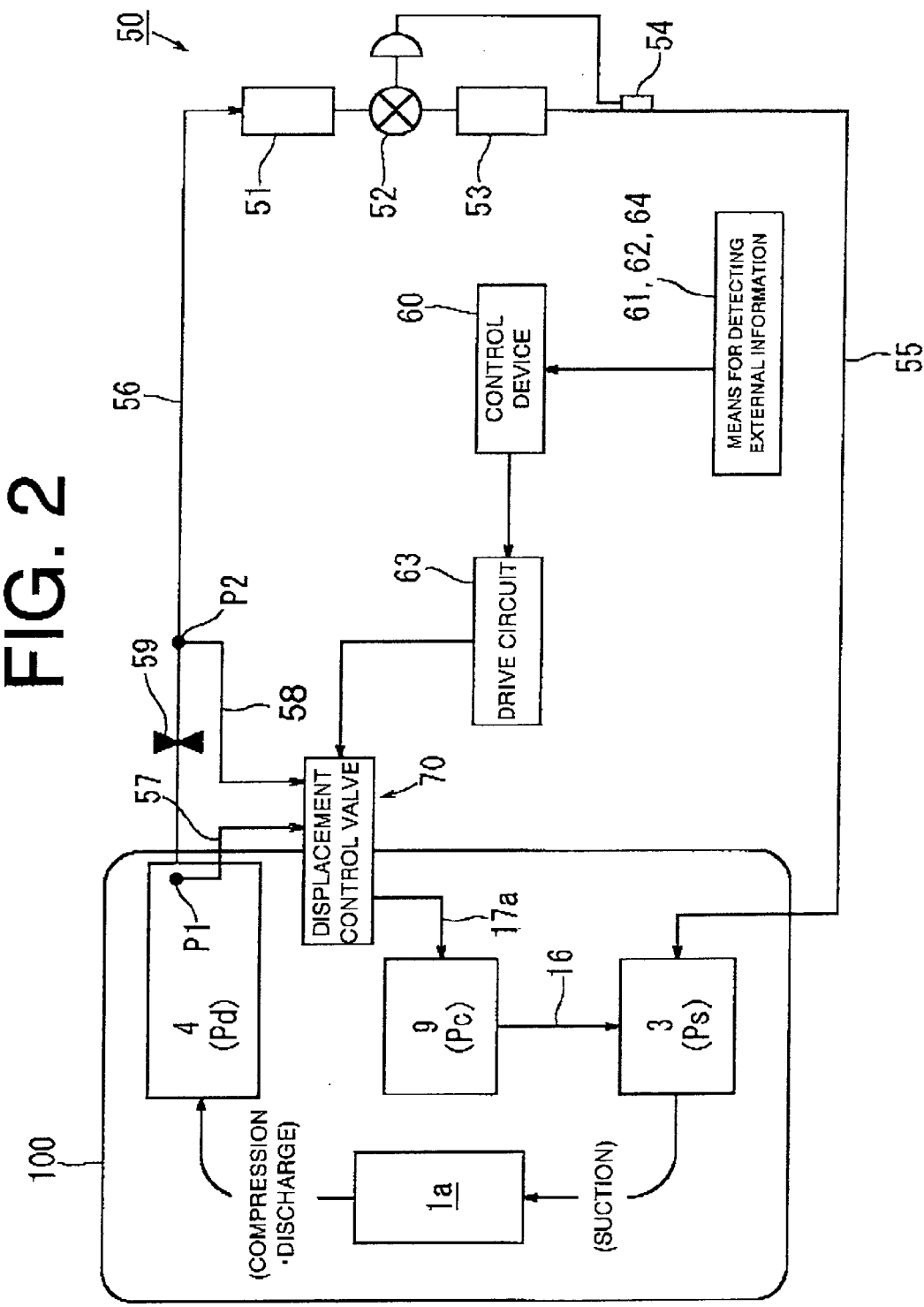
FIG. 2 is a schematic diagram illustrating an air conditioner according to the embodiment of the present invention.

As shown in FIG. 2, in the above-mentioned compressor 100, the suction chamber 3 (suction pressure Ps) and the discharge chamber 4 (discharge pressure Pd) are connected through an external refrigerant circuit 50 (that corresponds to a vehicle air conditioning circuit in the present invention) that is formed outside the compressor 100. The external refrigerant circuit 50, for instance, has a condenser 51 and a thermal expansion valve 52 that functions as a pressure reducing device and an evaporator 53. The opening degree of the expansion valve 52 is controlled by feedback or based on the temperature and pressure detected by a temperature sensing cylinder 54 placed on the side of the outlet or downstream of the evaporator 53. The thermal expansion valve 52 provides the amount of liquid refrigerant meeting the cooling load to the evaporator 53. Thereby, the amount of the refrigerant circulated in the external refrigerant circuit 50 is adjusted A circulation pipe 55 is provided downstream in the external refrigerant circuit 50, thereby connecting the outlet of the evaporator 53 to the suction chamber 3 in the compressor 100. A circulation pipe 56 is provided upstream in the external refrigerant circuit 50, thereby connecting the discharge chamber 4 in the compressor 100 to the inlet of the condenser 51. The compressor 100 draws refrigerant introduced into the suction chamber 3 from a downstream region in the external refrigerant circuit 50 and compresses it. Then, the compressor 100 discharges the compressed refrigerant into the discharge chamber 4 that connects to an upstream region in the external refrigerant circuit 50. The external refrigerant circuit 50 and the compressor 100 constitute the vehicle air conditioning device in the present invention.

As a flow rate of refrigerant that flows in the air conditioning circuit or a flow rate Q of circulating refrigerant increases, the pressure loss in the circuit or the pipe unit length increases. In other words, the pressure loss or pressure differential in a flow rate between pressure monitoring points P1 and P2 that are placed along the air conditioning circuit indicates positive correlation with the flow rate Q of circulating refrigerant in the circuit. Therefore, the flow rate Q of circulating refrigerant in the air conditioning circuit can be indirectly detected by finding pressure differential (PdH–PdL) in the flow rate between the pressure monitoring points P1 and P2. In the present embodiment, the pressure monitoring point P1 that functions as an upstream higher pressure monitoring point is defined in the discharge chamber 4 corresponding to the most upstream area of the circulation pipe 56. Furthermore, the pressure monitoring point P2 that functions as a downstream lower pressure monitoring point is defined midway through the circulation pipe 56 that is located at a predetermined distance from the pressure monitoring point P1. The gas pressure PdH at the monitoring point P1 is introduced to the displacement control valve 70 through a first passage 57 for introducing pressure and on the other hand, the gas pressure PdL at the monitoring point P2 is introduced to the displacement control valve 70 through a second passage 58 for introducing pressure.

Midway between the pressure monitoring points P1 and P2 in the circulation pipe 56 is provided with a fixed throttle 59 that functions as means for expanding pressure differential between two points. The fixed throttle 59 is capable of expanding primary pressure differential between the pressure monitoring points P1 and P2 without placing the pressure monitoring points P1 and P2 at relatively great distance. Therefore, providing the fixed throttle 59 between the pressure monitoring points P1 and P2 enables the pressure monitoring point P2 to be placed closer to the compressor 100 and thus shortens the length of the second passage 58 for introducing pressure that is located between the pressure monitoring point P2 and the displacement control valve 70 placed in the compressor 100. Furthermore, the pressure PdL at the pressure monitoring point P2 is set to be relatively sufficiently high compared to the crank pressure Pc even though the pressure PdL at the pressure monitoring point P2 is lower than the pressure PdH at the pressure monitoring point P1 due to the function of the fixed throttle 59.

Next, a control device for regulating the amount of discharged refrigerant from the compressor 100 is described herein A temperature setting device 61 in a vehicle compartment, a temperature sensor 62 in the vehicle compartment, a sensor 64 for rotational speed, a clutch mechanism C and a displacement control valve 70 are respectively connected to a control device 60 that functions as a control means. The temperature setting device 61 sets a temperature in the vehicle compartment. The temperature sensor 62 detects the temperature in the vehicle compartment (in this case, the temperature sensor 62 is placed in the vehicle compartment) or the temperature that reflects the temperature in the vehicle compartment (in this case, for instance, the temperature sensor 62 is placed near the evaporator 53). The sensor 64 detects the rotational speed of an output shaft (not shown) that is secured to a vehicle engine E. The control device 60 is a control unit that has CPU, ROM, RAM and I/O interface. The temperature setting device 61, the temperature sensor 62 and the sensor 64 are connected to an input terminal of I/O and the output terminal of I/O is connected to the displacement control valve 70 through a drive circuit 63. The temperature setting device 61, the temperature sensor 62 and the sensor 64 constitute a means for detecting external information. Also, a means for controlling displacement according to the present invention is constituted of the control device 60 and the displacement control valve 70.

Figure 3:
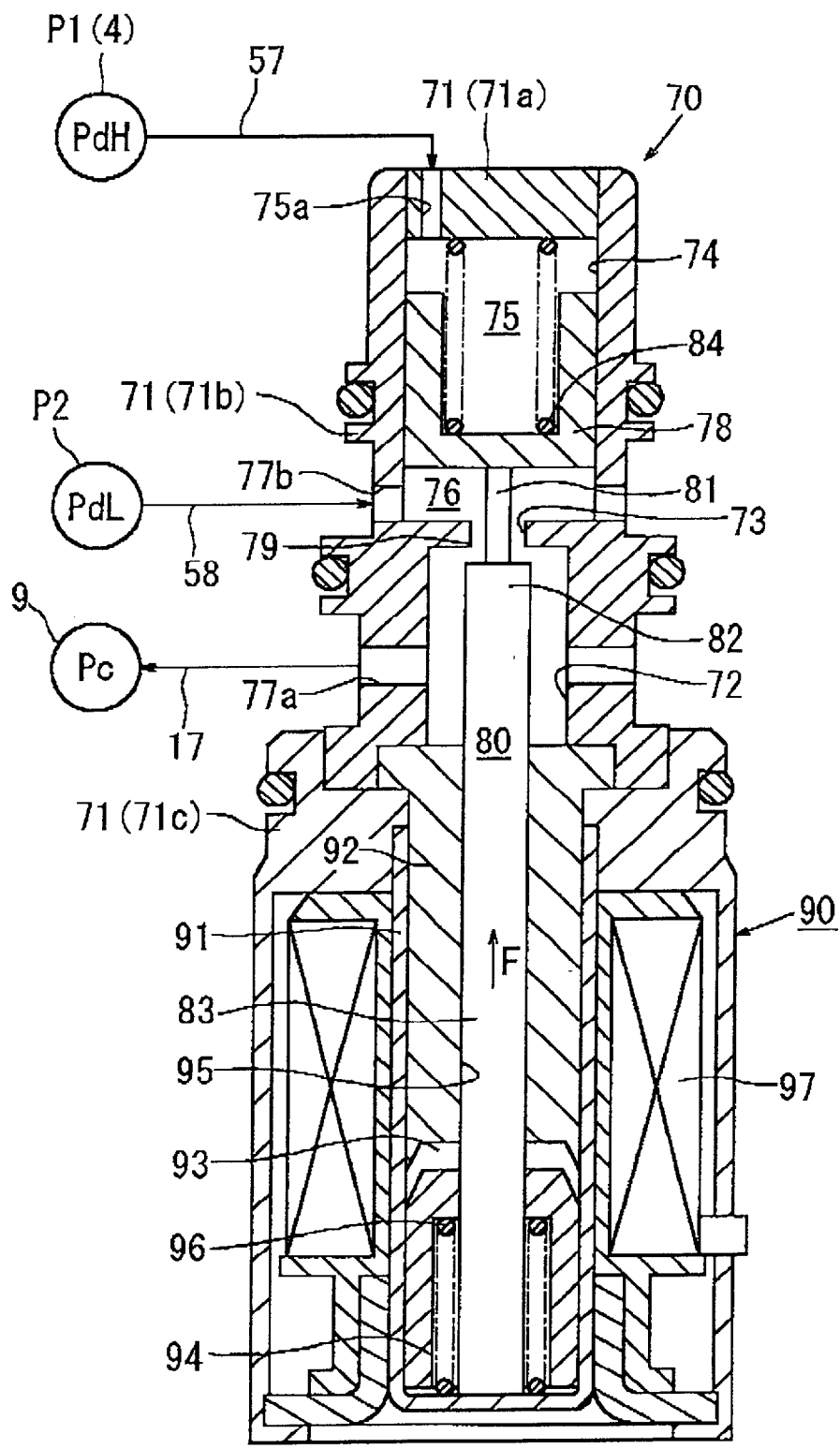
FIG. 3 is a longitudinal cross-sectional view illustrating a displacement control valve 70 of FIG. 1.

Next, the structure of the above-described displacement control valve 70 is described herein. As shown in FIG. 3, the displacement control valve 70 includes an inlet valve portion on the upper side and a solenoid 90 on the lower side. The inlet valve portion adjusts the opening degree of the supply passage 17 linking the pressure monitoring point P2 and the crank chamber 9. The solenoid 90 functions as an electromagnetic actuator for regulating by urging a rod 80 that is placed in the control valve 70 based on an external energizing control. The rod 80 is in the shape of stick. The rod 80 also includes a connecting portion 81 that is located at the distal end of the rod 80, a valve body portion 82 that is located substantially in the middle of the rod 80, and a guide rod portion 83 that is at the proximal end of the rod 80. The valve body portion 82 is a part of the guide rod portion 83.

A valve housing 71 of the displacement control valve 70 includes a cap 71a, an upper main portion 71b and a lower main portion 71c. A valve chamber 72 and a communication passage 73 are defined in the upper main portion 71b and a pressure sensing chamber 74 is defined between the upper main portion 71b and the cap 71a. The rod 80 is movably placed in the direction of an axis of the rod 80 (or vertically in FIG. 3) in the valve chamber 72, the communication passage 73 and the pressure sensing chamber 74. The valve chamber 72 and the communication passage 73 are capable of communicating with each other depending on the arrangement of the rod 80, whereas the communication passage 73 and a part of the pressure sensing chamber 74 (a second pressure chamber 76 described hereafter) constantly communicate with each other.

A bottom wall of the valve chamber 72 is provided by the upper end of a stationary core 92 described later. A port 77a that is formed on the circumferential wall of the valve housing 71 extends radially through the circumferential wall surrounding the valve chamber 72. The port 77a enables the valve chamber 72 to communicate with the crank chamber 9 through the communication passage 73 that is located downstream in the supply passage 17. The pressure sensing chamber 74 (or the second pressure chamber 76) is surrounded by the valve housing 71 and the port 77b extends radially on the circumferential wall of the valve housing 71. The port 77b enables the communication passage 73 to communicate with the pressure monitoring point P2 through the second passage 58 that is located upstream to the pressure sensing chamber 74 (or the second pressure chamber 76) and the supply passage 17. Therefore, the port 77a, the valve chamber 72, the communication passage 73, the pressure sensing chamber 74 (or the second pressure chamber 76), and the port 77b constitute a part of the supply passage 17 as a passage in the displacement control valve 70.

The valve body portion 82 of the rod 80 is arranged in the valve chamber 72. The inside diameter of the communication passage 73 is larger than the outside diameter of the connecting portion 81 of the rod 80 and smaller than the outside diameter of the guide rod portion 83. In other words, the cross sectional area of the communication passage 73, is larger than the cross sectional area of the connecting portion 81 and is smaller than the cross sectional area of the guide rod portion 83. A step between the valve chamber 72 and the communication passage 73 functions as a valve seat 79. The communication passage 73 functions as a kind of valve port. When the rod 80 moves upward from the lowest position as shown in FIG. 3 to the highest position in which the valve body portion 82 is seated on the valve seat 79, the communication passage 73 is blocked. In other words, the valve body portion 82 of the rod 80 functions as an inlet valve body that is able to adjust the opening degree of the supply passage 17 as desired.

A movable wall 78 that functions as a first pressure sensing portion is placed in the pressure sensing chamber 74 so as to be movable in its longitudinal axis. The movable wall 78 is in the shape of a cylinder with a bottom or columnar shape and divides the pressure sensing chamber 74 into two parts at the bottom portion to define P1 pressure chamber (or a first pressure chamber) 75 functioning as a high-pressure chamber and P2 pressure chamber (or the second pressure chamber) 76 functioning as a low pressure chamber. The movable wall 78 functions as a pressure separation wall that stands between the P1 pressure chamber 75 and the P2 pressure chamber 76 and does not allow direct communication between both the pressure chambers 75 and 76. The cross sectional area of the outside diameter of the movable wall 78 is larger than that of the inside diameter of the communication passage 73.

The P1 pressure chamber 75 constantly communicates with the discharge chamber 4 in which the upstream pressure monitoring point P1 is located, through the P1 port 75a formed in the cap 71a and the first passage 57. On the other hand, the P2 pressure chamber 76 constantly communicates with the upstream pressure monitoring point P2 through the port 77b that is a part of the supply passage 17. In other words, the discharge pressure Pd is introduced to the P1 pressure chamber 75 as the PdH and the pressure PdL of the pressure monitoring point P2 that is formed midway in the pipe is introduced to the P2 pressure chamber 76. Thus, the top surface and the bottom surface of the movable wall 78 are pressure receiving surfaces that receive respectively the pressure PdH and the pressure PdL The end of the connecting portion 81 for the rod 80 is arranged in the second pressure chamber 76 and the movable wall 78 is connected to the end of the connecting portion 81. Furthermore, a return spring 84 is disposed in the P1 pressure chamber 75. The return spring 84 pushes the movable wall 78 in the direction from the P1 pressure chamber 75 to the P2 pressure chamber 76.

The solenoid 90 of the displacement control valve 70 includes an accommodation cylinder 91 with a bottom surface. The stationary core 92 is fitted in the upside of the accommodation cylinder 91 and thus a solenoid chamber 93 is defined in the accommodation cylinder 91. A movable core 94 that functions as a plunger is accommodated in the solenoid chamber 93 so as to be movable in an axial direction of the movable core 94. A guide hole 95 is formed in the center of the stationary core 92 to extend in the axial direction. The guide rod portion 83 of the rod 80 is arranged in the guide hole 95 so as to be movable in the axial direction. Furthermore, a small amount of clearance (not shown) is secured between the inner wall surface of the guide hole 95 and the guide rod portion 83 and the valve chamber 72 communicates with the solenoid chamber 93 through the clearance, in other words, the pressure in the solenoid chamber 93 corresponds to the crank pressure Pc via the valve chamber 72.

The solenoid chamber 93 is also a region that accommodates a proximal end of the rod 80. In other words, the lower end of the guide rod portion 83 is fitted in a through hole formed in the center of the movable core 94 in the solenoid chamber 93 and is fixed to the movable core 94 by caulking. Therefore, the movable core 94 and the rod 80 are integrally moved upward and downward A shock absorbing spring 96 is disposed in the solenoid chamber 93 and the shock absorbing spring 96 acts on the movable core 94 to move closer to the stationary core 92 and urges the movable core 94 and the rod 80 upward. The return spring 84 functions as a means for initialization in order to return the movable core 94 and the rod 80 to the lowest movable point that is the initial position while the electromagnetic actuator is turned off, because the shock absorbing spring 96 has less spring tension than the return spring 84.

A coil 97 is wound around the stationary core 92 and the movable core 94. A current flows to the coil 97 based on signals received from the control device 60 and the coil 97 generates electromagnetic force F based on the magnitude of electric current. Furthermore, the movable core 94 is thus moved toward the stationary core 92 by the electromagnetic force F and the rod 80 also moves upward. In the present embodiment, the input current applied to the coil 97 corresponding to the control current of the present invention is varied during the protective control operation described hereafter and the operation of the variable displacement valve 70 is regulated in accordance with the value of the input current.

Next, the control method utilizing the control device 60 and the displacement control valve 70 is described herein. When the vehicle engine E is in operation and an air conditioner in a car is turned ON (not shown), if the temperature detected by the temperature sensor 62 becomes equal to or higher than the preset temperature set in temperature setting device 61, the control device 60 connects the clutch mechanism C and the compressor 100 thus starts to operate the compressor 100. The control device 60 determines the value of the input current based on the external information such as the preset temperature of the temperature setting device 61 and the detected temperature from the temperature sensor 62. The value of the input current is commanded from the control device 60 to the drive circuit 63. The commanded input current is entered from the drive circuit 63 to the coil 97 of the displacement control valve 70. When the current is entered from the drive circuit 63 to the coil 97, the attractive force (or electromagnetic force F) is generated according to the value of the current. The valve body portion 82 of the rod 80 is located with respect to the valve seat 79 according to the attraction force and the opening degree of the valve hole is determined. When the valve body portion 82 is furthest from the valve seat 79, the opening degree becomes maximum. The amount of refrigerant gas drawn into the crank chamber 9 through the supply passage 17 is determined in accordance with the opening degree of the valve hole. The crank pressure Pc is adjusted with respect to the amount of refrigerant gas drawn into the crank chamber 9 through the supply passage 17 and the amount of the refrigerant gas relieved from the crank chamber 9 through the bleeding passage 16.

During the normal operation of the air conditioner, if the cooling load is large, the temperature differential between the detected temperature at the temperature sensor 62 and the preset temperature at the temperature setting device 61 becomes large. The control device 60 regulates the value of the input current with respect to the coil 97 of the displacement control valve 70 in order to decrease the target pressure differential and increase the displacement of the compressor 100 based on the large differential between the detected temperature and the preset temperature. In other words, the control device 60 commands the drive circuit 63 to decrease the value of the input current applied to the coil 97 and the attractive force as the temperature differential between the detected temperature and the preset temperature increases. As a result, the control device 60 adjusts the opening degree of the displacement control valve 70 within the smaller range of the opening degree by operating the valve body portion 82 of the rod 80 in order to maintain the larger discharge displacement of the compressor 100.

On the other hand, if the cooling load is small, the temperature differential between the detected temperature at the temperature sensor 62 and the preset temperature at the temperature setting device 61 becomes small. The control device 60 regulates the value of the input current with respect to the coil 97 of the displacement control valve 70 in order to increase the preset pressure differential and decrease the discharge displacement of the compressor 100 based on the small differential between the detected temperature and the preset temperature. In other words, the control device 60 commands the drive circuit 63 to increase the value of the input current applied to the coil 97 and the attractive force as the temperature differential between the detected temperature and the preset temperature decreases. As a result, the control device 60 adjusts the opening degree of the displacement control valve 70 within the larger range of the opening degree by operating the valve body portion 82 of the rod 80 in order to maintain the smaller discharge displacement of the compressor 100. As described above, regulating the discharge displacement of the compressor based on the cooling load corresponds to the normal control of the discharge displacement of the compressor according to the present invention.

Figure 4:
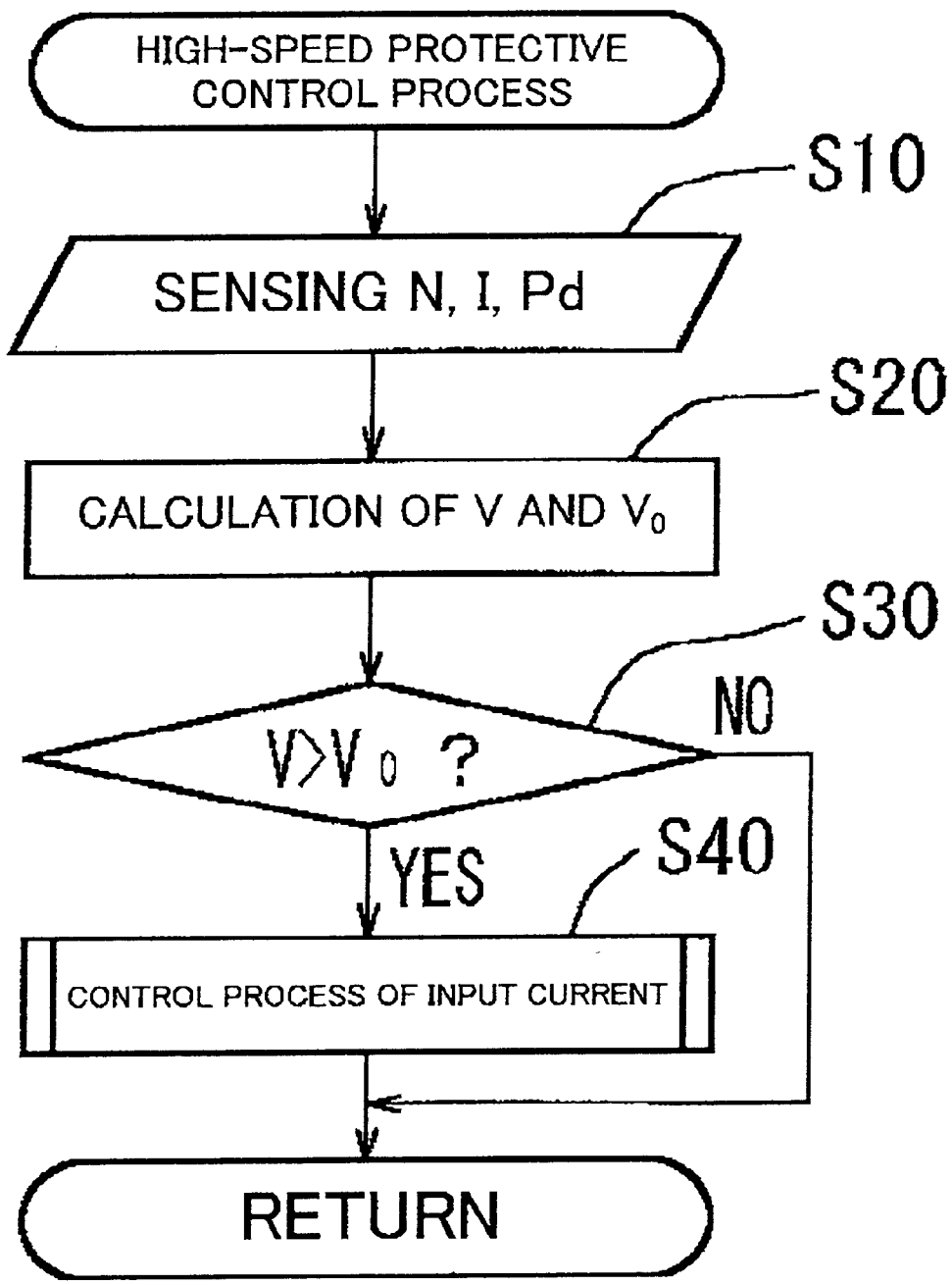
FIG. 4 is a flow chart illustrating a high-speed protective control process of the compressor 100 according to the embodiment of the present invention.
Figure 5:
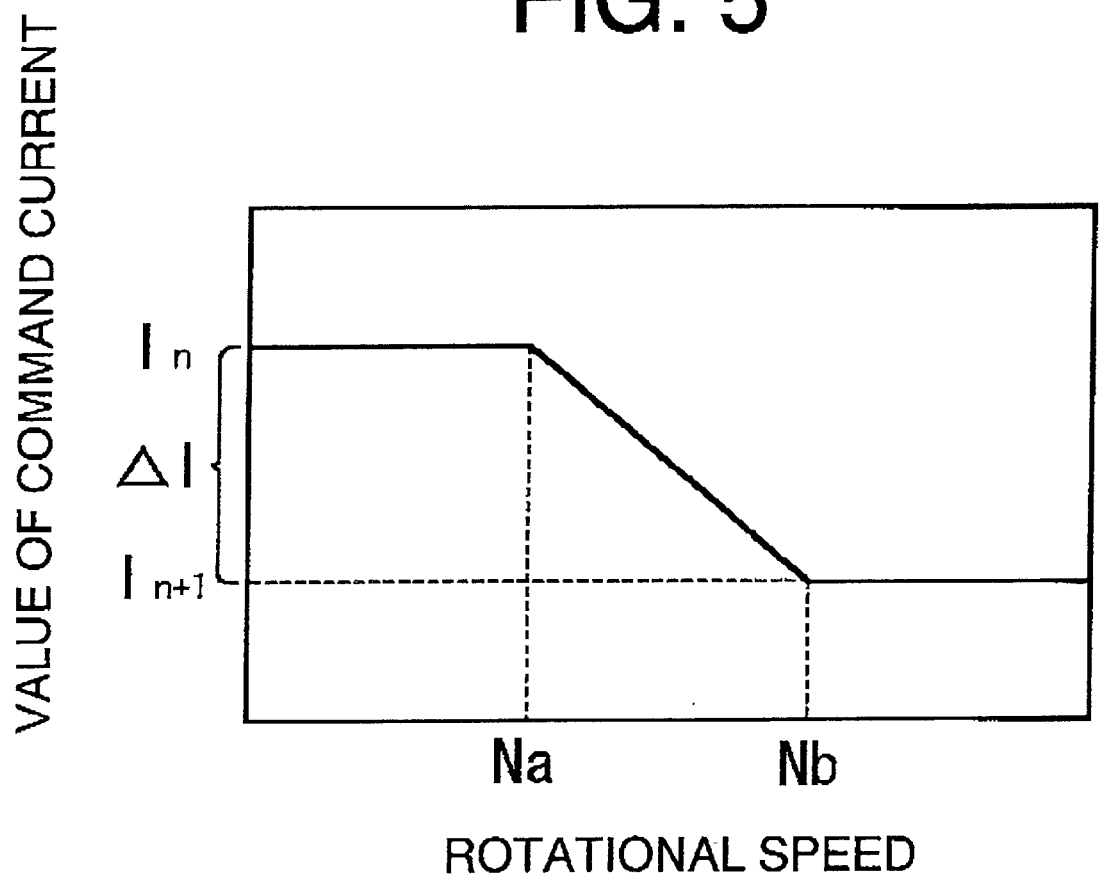
FIG. 5 is a graph illustrating a relation between the rotational speed N and the value $I_n$ of command current during the high-speed protective control process of the compressor 100 according to the embodiment of the present invention.

In the compressor 100 according to the present embodiment, the protective control by the displacement control valve 70 taking the inertial force caused by the movement of the piston 15 into consideration, is performed, in order to improve the reliability of the compressor itself, to be concrete, the strength of the piston 15 and the displacement control against the hunting during the high-speed operation. In other words, the displacement control valve 70 is regulated in order to limit the magnitude of the inertial force caused by the movement of the piston 15 within the predetermined allowable range. For example, the high-speed protective control by the displacement control valve 70 is operated to improve the strength and the displacement control of the piston 15 during the high-speed operation. During the high-speed protective control operation, the control device 60 controls the maximum limit for the value $I_n$ of the command current with respect to the coil 97 based on the rotational speed N of the compressor 100, the value I of the input current applied to the coil 97 of the displacement control valve 70 and the refrigerant discharge pressure Pd. The process of the control device 60 during the high-speed protective operation is described herein, referring to FIGS. 4 and 5. FIG. 4 is a flow chart illustrating high-speed protective control process of the compressor 100. FIG. 5 is a graph illustrating the relation between the rotational speed N and the value $I_n$ of command current during the high-speed protective operation.

As shown in FIG. 4, when the high-speed protective control process starts, the control device 60 detects the rotational speed N of the compressor 100, the value I of the input current applied to the coil 97 of the displacement control valve 70 and the refrigerant discharge pressure Pd in a step S10. The rotational speed N, for example, is figured based on the rotational speed of the vehicle engine E (the detected value by the sensor 64 for rotational speed). In the next step S20, the control device 60 calculates the value V of discharge amount under high-speed protective control and the upper threshold value $V_0$ of discharge amount (corresponding to a reference value of discharge amount according to the present invention). The rotational speed N, the current value I, and the refrigerant discharge pressure Pd are utilized in order to figure the value of the discharge amount V. An operation torque T of the compressor 100 is estimated by the values mentioned above and an experimental formula to estimate the value of the torque and the value V of the discharge amount is figured based on the operation torque T and a maximum torque $T_n$. A map is prepared so that the rotational speed N and the refrigerant discharge pressure Pd are defined and subsequently, the value $V_0$ of the discharge amount is defined. The value $V_0$ of the discharge amount is figured by utilizing the map. The value $V_0$ of the discharge amount is limited so as not to exceed the allowable range predetermined by the inertial force that is caused by the movement of the piston 15. It is also possible to provide a structure to enable the control device 60 to detect the refrigerant suction pressure Ps with the rotational speed N, the current value I, and the refrigerant discharge pressure Pd in the step S20. Thus, the simple control process utilizing the common formula to estimate the value of the torque instead of the experimental formula is possible in order to calculate the maximum value $V_0$ of the discharge amount.

The operation torque T in the compressor 100 is figured based on a compression work and the rotational speed N by calculating the compression work of the compressor 100 utilizing the flow rate Q of refrigerant circulating through the external refrigerant circuit 50. FIG. 4 illustrates the flow chart in which the flow rate Q of circulating refrigerant is indirectly estimated by utilizing the rotational speed N, the current value I and the refrigerant discharge pressure Pd. The flow rate Q of circulating refrigerant is also able figured by the value that is directly detected utilizing the pressure loss (or the pressure differential in flow rate) between the pressure monitoring points P1 and P2.

The operation torque T is, for example, calculated by the following formulas from (1) to (3). In the formula (1), n indicates a ratio of specific heat and $T_{loss}$ indicates loss torque. The loss torque $T_{loss}$ is constant determined by the structure of the compressor. In the formula (2), $\Delta Pd$ indicates the pressure loss (the pressure differential in flow rate) between the pressure monitoring points P1 and P2 and $\rho d$ indicates the specific gravity of the discharged refrigerant. As indicated in the formula (3), the pressure differential in flow rate $\Delta Pd$ is indicated as a function $f_1(I)$ for the value of the input current applied to the coil 97 and the pressure differential in flow rate $\Delta Pd$ is determined by valve characteristics.

$$T = \frac{60}{2\pi \times N} \times \left[ \frac{n}{n-1} Pd \times Q \times \left\{ 1 - \left(\frac{Pd}{Ps}\right)^{\frac{1-n}{n}} \right\} \right] + T_{loss} \quad (1)$$

$$Q = \begin{pmatrix} \text{COEFFICIENT} \\ \text{OF FLOW RATE} \end{pmatrix} \times \begin{pmatrix} \text{CROSS-SECTIONAL AREA} \\ \text{OF FIXED THROTTLE} \end{pmatrix} \times \sqrt{2 \cdot \Delta Pd / \rho d} \quad (2)$$

$$\Delta Pd = f_1(I) \quad (3)$$

The value V of the discharge amount is also calculated directly without the operation torque T. In this case, it is possible to calculate the value V of the discharge amount with the following formulas (4), (5) and the above-mentioned formulas (2) and (3) in which n indicates efficiency of discharged volume. As indicated in the formula (5), the efficiency η of discharged volume is indicated as a function $f_2(Pd, Ps, N)$ for the refrigerant discharge pressure Pd, the refrigerant suction pressure Ps and the rotational speed N of the compressor 100. Further, when the refrigerant suction pressure Ps is not able to be detected directly, the temperature at the downstream of the evaporator 53 and voltage applied to the blower attached to the evaporator 53 are utilized to estimate the refrigerant suction pressure Ps.

$$V = Q/(\eta \cdot N) \quad (4)$$

$$\eta = f_2(Pd, Ps, N) \quad (5)$$

In the next step S30, the value V of the discharge amount and the maximum value $V_0$ of the discharge amount that are calculated in the step S20 are compared. It is possible to obtain the actual operating information of the compressor 100 according to the present invention by utilizing the value V of the discharge amount and the maximum value $V_0$ of the discharge amount. When the value V of the discharge amount is larger than the maximum value $V_0$ of displacement, namely, when the result of step S30 is YES, the high-speed protective control process proceeds from the step 30 to the step S40. In this case, the compressor 100 is regarded to be in a predetermined excessive actual operating state according to the present invention.

On the other hand, when the value V of the discharge amount is equal to or less than the maximum value $V_0$ of the discharge amount, namely, when the result of step S30 is NO, the high-speed protective control process ends. In other words, when the value V of the discharge amount is equal to or less than the maximum value $V_0$ of the discharge amount, it is not necessary to define the maximum value of command current with respect to coil 97 and the value of command current is maintained during the normal operation of the air conditioner.

In the step S40, when the compressor 100 is in the predetermined high-speed rotation region based on the rotational speed N, the actual operating information is required. Further, when it is regarded that the compressor 100 is in the high-speed rotation region based on the actual operating information of the compressor 100, the control device 60 controls the input current applied to the coil 97. To be concrete, the value $I_n$ of the command current that is defined so that the value V of the discharge amount becomes the maximum value $V_0$ of the discharge amount and a value $I_m$ of the command current at the normal operation of the air conditioner are compared and the smaller current value of the two is input in the coil 97. When the value $I_n$ of the command current is less than the value $I_m$ of the command current, the value $I_n$ of the command current is input. On the other hand, when the value $I_n$ of the command current is equal to or larger than the value $I_m$ of the command current, the value $I_m$ of the command current is input. The value $I_n$ of command current is set, for example, with respect to the rotational speed N as shown in FIG. 5. As FIG. 5 illustrates, when the rotational speed increases from Na to Nb, the value of the command current is varied from $I_n$ to $I_{n+1}(=I_n - \Delta I)$. The region in which the rotational speed is more than Na corresponds to "the predetermined high-speed rotation region" according to the present invention. Thus, the value V of the discharge amount is controlled so as not to exceed the maximum value $V_0$ of the discharge amount. Therefore, the inertial force caused by the movement of the piston 15 is maintained within the predetermined allowable range.

Further, it is possible that the upper threshold value $V_0$ of the discharge amount has a certain range. In this case, the input current applied to the coil 97 is controlled in a such manner that the value V of the discharge amount is within the range of the threshold value.

In the present embodiment, following effects are obtained. An accurate control of the displacement taking the actual operating state of the compressor 100 into consideration in the predetermined high-speed rotation region is performed. When the value V of the discharge amount exceeds the maximum value $V_0$ of the discharge amount, regulating the command current (applied to the coil 97 of the displacement control valve 70) in order to increase the discharge displacement up to the maximum discharge displacement $V_0$, prevents the inertial force caused by the movement of the piston 15, from negatively affecting the controllability of displacement such as the strength and the hunting of the piston 15 itself.

Furthermore, in the present embodiment, it is possible to maintain the displacement controlability and the strength of the piston 15 during the high-speed operation even if the solid piston is utilized instead of the hollow piston. In this case, manufacturing cost of the solid piston can be reduced in comparison to that of the hollow piston.

Therefore, the present examples and embodiments are to be considered as illustrative and not restrictive and the invention is not to be limited to the details given herein but may be modified within the scope of the appended claims.

What is claimed is:

1. A variable displacement type compressor that circulates a refrigerant in an air conditioning circuit, the compressor comprising:
    a compression mechanism for compressing and discharging an amount of the refrigerant at a discharge pressure;
    a displacement controller for controlling the discharge amount of the refrigerant of the compressor based upon displacement; the displacement controller further comprising;
        a normal control means for controlling the displacement based on a cooling load; and
        a protective control means for controlling the displacement based on a value in connection with a rotational speed of the compressor and actual operating information on the compressor which is determined by a value of an actual discharge amount and a reference value of the discharge amount.

2. The variable displacement type compressor according to claim 1, wherein the value of the actual discharge amount is determined based on operation torque calculated by a flow rate of circulating refrigerant and maximum torque.

3. The variable displacement type compressor according to claim 2, wherein the flow rate of the circulating refrigerant is determined based on the value in connection with the rotational speed, a value of control current applied to the displacement controller and a value of the discharge pressure of the refrigerant.

4. The variable displacement type compressor according to claim 1 wherein the reference value of the discharge amount is an upper threshold value of the discharge amount.

5. The variable displacement type compressor according to claim 4 wherein the upper threshold value is calculated by utilizing a map which includes the rotational speed and the refrigerant discharge pressure.

6. The variable displacement type compressor according to claim 1, wherein the value of the actual discharge amount is determined based on the value in connection with the rotational speed, a value of control current applied to the displacement controller and the value of the discharge pressure of the refrigerant.

7. The variable displacement type compressor according to claim 1, wherein when the value of the actual discharge amount exceeds the reference value of the discharge amount, the displacement controller controls the displacement not to exceed the reference value of the discharge amount.

8. The variable displacement type compressor according to claim 1, wherein when the value of the actual discharge amount is not in a predetermined range of the reference value of the discharge amount, the displacement controller controls the displacement to be in the predetermined range.

9. The variable displacement type compressor according to claim 1, wherein when the value in connection with the rotational speed is in a predetermined high-speed rotation region, the displacement controller obtains the actual operating information, and wherein if the actual operating information indicates a predetermined high-speed actual operating state of the compressor, the protective control means is activated.

10. The variable displacement type compressor according to claim 1 wherein the refrigerant is drawn into the compressor, compressed and discharged by a solid piston.

11. An air conditioner comprising:
    an air conditioning circuit including a refrigerant;
    a condenser in the air conditioning circuit for condensing the refrigerant;
    an expansion valve in the air conditioning circuit for expanding the condensed refrigerant;
    an evaporator in the air conditioning circuit for evaporating the expanded refrigerant to exchange heat between the refrigerant and air in a room;
    a variable displacement type compressor in the air conditioning circuit for compressing the evaporated refrigerant; the compressor further comprising;
        a compression mechanism for compressing and discharging an amount of the refrigerant at a discharge pressure;
        a displacement controller for controlling the discharge amount of the refrigerant of the compressor based upon displacement; the displacement controller further comprising;
            a normal control means for controlling the displacement based on a cooling load; and
            a protective control means for controlling the displacement based on a value in connection with a rotational speed of the compressor and the actual operating information on the compressor which is determined by a value of an actual discharge amount and a reference value of discharge amount.

12. A method for controlling the displacement of a variable displacement type compressor, the method comprising the steps of:
    detecting a cooling load;
    controlling a discharge amount of a refrigerant based on the cooling load;
    detecting a value in connection with a rotational speed of the compressor;
    calculating a value of the actual discharge amount of the refrigerant;
    calculating the reference value of the discharge amount of the refrigerant; and
    determining the actual operating information based on the value of the actual discharge amount and the reference value of the discharge amount; and
    further controlling the actual discharge amount based on the value in connection with the rotational speed and the actual operating information.

13. The method for controlling the displacement according to claim 12, wherein the actual discharge amount value calculating step further comprises additional steps of:
    obtaining a flow rate of circulating refrigerant;
    calculating a value of operation torque and a maximum value of the torque; and determining a value of the actual discharge amount based on the value of the operation torque and the maximum value of the torque.

14. The method for controlling the displacement according to claim 13, wherein the determining step further comprises additional steps of:

detecting a value of control current applied to the displacement controller;

detecting a value of the discharge pressure of the refrigerant; and determining the flow rate of the circulating refrigerant based on the value in connection with the rotational speed, the value of the control current and the value of the discharge pressure.

15. The method for controlling the displacement according to claim 12, wherein the determining step further comprises an additional step of controlling the value of the actual discharge amount not to exceed the reference value of the discharge amount when the value of the actual discharge amount exceeds the reference value of the discharge amount.

16. The method for controlling the displacement according to claim 12, wherein the determining step further comprises an additional step of controlling the actual discharge amount to be in a predetermined range of the reference value of the discharge amount when the value of the actual discharge amount is not in the predetermined range of the reference value of discharge amount.

17. The method for controlling the displacement according to claim 12, wherein the actual discharge amount controlling step further comprises additional steps of:

obtaining the actual operating information when the value in connection with the rotational speed is in a predetermined high-speed range; and controlling the actual discharge amount.

18. The method for controlling the displacement according to claim 12, wherein a solid piston is utilized in order to draw, compress, and discharge the refrigerant.

* * * * *